(No Model.)

J. AITCHISON & T. BRADLEY.
OPERA, FIELD, MARINE, OR OTHER GLASS.

No. 500,835. Patented July 4, 1893.

UNITED STATES PATENT OFFICE.

JAMES AITCHISON AND THOMAS BRADLEY, OF LONDON, ENGLAND.

OPERA, FIELD, MARINE, OR OTHER GLASS.

SPECIFICATION forming part of Letters Patent No. 500,835, dated July 4, 1893.

Application filed November 25, 1891. Serial No. 413,094. (No model.) Patented in England January 20, 1891, No. 1,016.

*To all whom it may concern:*

Be it known that we, JAMES AITCHISON, oculist-optician, residing at 47 Fleet Street and 42 Bishopsgate Street within, and THOMAS BRADLEY, engineer, residing at 90 Gibbon Road, Nunhead, London, England, subjects of the Queen of Great Britain, have invented certain new and useful Improvements in Opera, Field, Marine, or other Glasses, (for which we have obtained a patent in Great Britain, No. 1,016, bearing date January 20, 1891,) of which the following is a specification.

This invention relates to opera, field, marine, and other glasses; and has for its object to provide new and improved means for adjusting the collapsible barrels.

To accomplish this object our invention consists in the features of construction and the combination or arrangement of devices hereinafter described and claimed, reference being made to the accompanying drawings, in which—

Figure 1:
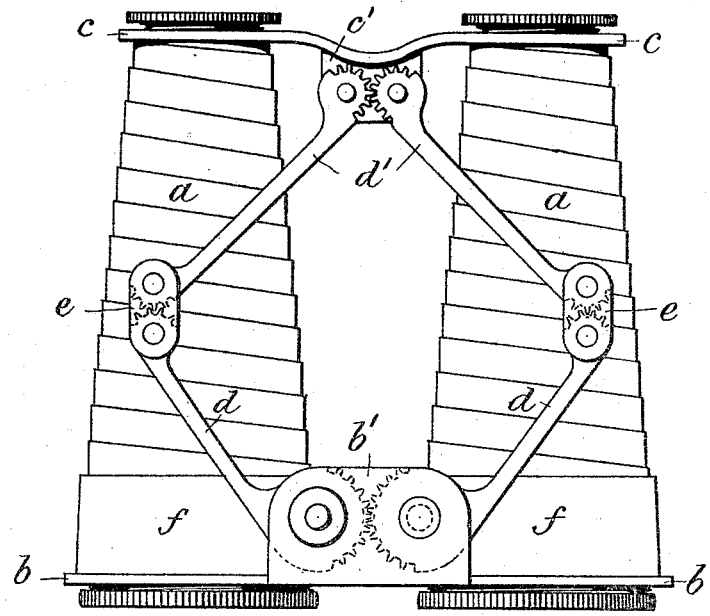
Figure 2:
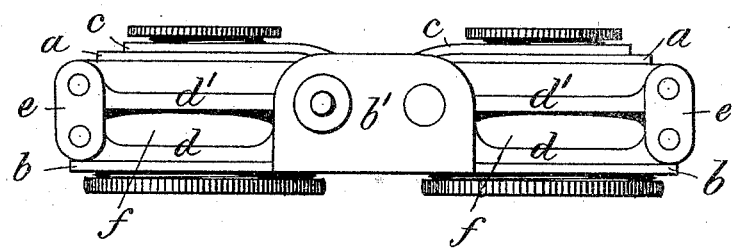
Figure 3:
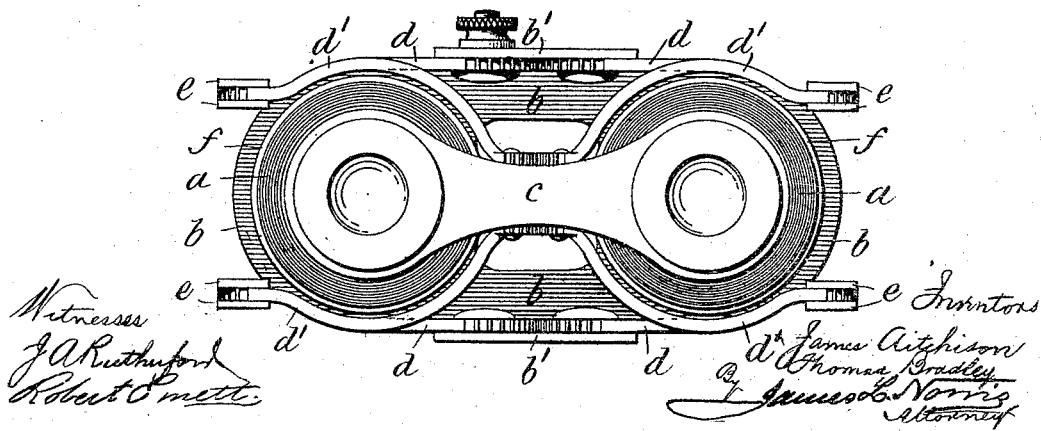

Figure 1 is an elevation of an opera glass constructed in accordance with our invention, and showing the barrels extended. Fig 2 is a similar view, showing the barrels collapsed; and Fig. 3 is a plan view of the same.

$a\ a$ are the volute barrels. $b$ is one of the frames to which the object lenses are attached.

$c$ is the frame to which the eye-lenses are attached.

$d\ d\ d'\ d'$ are four links or connecting rods, forming a set of parallel motion bars. Four similar links are fitted to the other side of the opera glass. The ends of the links are formed with teeth meshing into each other. These teeth render the motions of the links simultaneous, and thereby secure the parallelism of the frames $b$ and $c$.

$b'\ b'$ are two plates forming parts of the frame $b$, and $c'\ c'$ are plates forming parts of the frame $c$. One end of each of the links $d\ d$ is pivoted to one of the plates $b'$, the ends being provided with mutilated toothed gearing to secure simultaneous action.

$e\ e$ are plates inclosing the outer ends of the links $d\ d$, and also the outer ends of the links $d'\ d'$, the other ends of the links $d'\ d'$ being pivoted to the plates $c'\ c'$; all the ends being similarly geared together with mutilated toothed gear.

We sometimes dispense with the toothed gear at $e\ e$ and $c'$, and unite the links with ordinary rule or other joints.

The cells $f\ f$ are preferably formed of aluminium, with brass linings for the screws, for the purpose of reducing weight. Other well known methods of securing parallel motion may be adopted.

We sometimes add a set screw and nut to the boss of one of the levers on the plate $b'$ for fixing the glasses at any desired focus as clearly shown in Fig. 3.

In the construction of monocular instruments it is obvious that the parallel motion bars are not necessary, such instruments being rendered rigid, after suitable extension, by slightly twisting the coiled tube.

We claim—

1. In opera and other glasses, the combination with collapsible barrels carrying object glasses and eye glasses, of pivoted links or rods provided with mutilated gears for extending said barrels, substantially as described.

2. In opera and other glasses, the combination with extensible barrels carrying object glasses, and eye glasses of a plate adjacent to the object glasses, a plate adjacent to the eye glasses, links or rods pivoted in said plates, said links or rods provided with gears meshing with each other, and means for locking said bars against movement, substantially as described.

Dated this 6th day of November, 1891.

JAMES AITCHISON.
THOMAS BRADLEY.

Witnesses:
GEORGE F. DOWNING,
 8 *Quality Court, London, W. C.*
JOSEPH LAKE,
 17 *Gracechurch Street, London, E. C.*